(12) United States Patent
Levey

(10) Patent No.: US 6,193,455 B1
(45) Date of Patent: Feb. 27, 2001

(54) BLIND SCREW ANCHOR AND SYSTEM

(75) Inventor: Kenneth Levey, Island Lake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/407,744

(22) Filed: Sep. 28, 1999

(51) Int. Cl.[7] .................................................. F16B 37/04
(52) U.S. Cl. ............................ 411/179; 411/181; 411/466
(58) Field of Search ...................................... 411/461, 466, 411/472, 179, 181, 176, 184, 187, 183, 467, 468, 427, 516, 570, 525, 526, 528

(56) References Cited

U.S. PATENT DOCUMENTS

| | | |
|---|---|---|
| 1,297,523 | * 3/1919 | With . |
| 1,328,201 | * 1/1920 | Rendano . |
| 2,339,841 | * 1/1944 | Deuchler . |
| 2,486,769 | * 11/1949 | Watson . |
| 2,654,620 | * 10/1953 | Tinnerman . |
| 3,177,915 | * 4/1965 | La Fleur . |
| 3,266,362 | * 8/1966 | Carr . |
| 3,502,129 | 3/1970 | Negoro . |
| 3,802,476 | 4/1974 | Hoadley . |
| 4,439,907 | * 4/1984 | Block . |
| 4,554,773 | * 11/1985 | Conley . |
| 4,595,325 | 6/1986 | Moran et al. . |
| 4,697,945 | * 10/1987 | Geiger . |
| 4,753,561 | 6/1988 | Betterton et al. . |
| 5,439,336 | 8/1995 | Muller . |
| 5,531,552 | 7/1996 | Takahashi et al. . |
| 5,549,430 | 8/1996 | Takahashi et al. . |
| 5,842,807 | * 12/1998 | To . |
| 6,007,266 | * 12/1999 | Cheng . |

* cited by examiner

Primary Examiner—Flemming Saether

(57) ABSTRACT

An anchoring device having a plate member with a fastening member on a first side thereof, and a utility member fastening portion disposed on the anchoring device, for example a threaded aperture. The anchoring device is fastened to portion of a panel devoid of openings, and an anchoring device locating indicium is disposed on a side of the panel opposite the anchoring device, in alignment therewith. The fastening member may be a plurality of teeth each having a distal tip portion protruding from a side of the plate member and oriented at a non-perpendicular angle relative thereto, preferably about an aperture. A plurality of material deformation clearances are disposed on the plate member so that one of the plurality of material deformation clearances is aligned with a corresponding one of the plurality of teeth, adjacent to the tip portion thereof.

27 Claims, 2 Drawing Sheets

BLIND SCREW ANCHOR AND SYSTEM

CROSS REFERENCE TO RELATED APPLICATIONS

The present application is related to co-pending U.S. application Ser. No. 09/407,152 filed on Sep. 28, 1999 entitled "Method For Fastening Blind Anchor", which is assigned commonly herewith and incorporated herein by reference.

BACKGROUND OF THE INVENTION

The invention relates generally to anchoring devices and systems, and more particularly to anchors blindly fastenable to panels and combinations thereof.

Anchors fastenable to panels for support are known generally. U.S. Pat. No. 3,802,476 entitled "Screw Anchor", for example, discloses a screw anchoring device adhered over an opening through a wall panel on one side thereof for subsequently accepting a screw disposed through the opening from an opposite side of the wall panel.

The anchoring device of U.S. Pat. No. 3,802,476 includes more particularly a plate member having angled wings on opposite edges thereof and a central aperture, about which is formed a helical screw impression protruding from the same side thereof as the wing members. Two tabs located on opposite sides of the helical screw impression protrude at right angles from the side of the plate member opposite the side thereof from which the helical screw impression protrudes, and a pressure sensitive adhesive pad or tape is adhered to the side of the plate member from which the tabs protrude. The tabs protrude through the adhesive pad and facilitate alignment of the anchoring device aperture with the panel opening. Thereafter, a screw disposed into the panel opening from the side thereof opposite the anchoring device is threadably engageable with the helical depression formed about the aperture of the anchoring device, for example to mount a bracket or some other utility member to the panel.

A popular application for the anchoring device of U.S. Pat. No. 3,802,476, among others, is for mounting shelf supporting brackets on interior liners of refrigerators. In this application, the anchoring devices are mounted over corresponding openings on a side of the liner that is not visible from the interior of the refrigerator. The assembly of the anchoring device is performed manually by inserting the tabs in the liner opening and then pressing the anchoring device against the side of the liner until the pressure sensitive pad or tape adheres the anchoring device thereto. The anchoring device seals the opening through the liner to prevent insulating foam injected between the liner and an outer structure of the refrigerator from contaminating the interior thereof, during manufacturing. Besides aligning the anchoring device, the opening through the liner indicates the location of the anchoring device for subsequently fastening a screw thereto from the interior of the refrigerator. Occasionally, however, openings through the liner are not completely covered or properly sealed by anchoring devices, thus allowing insulating foam to contaminate the interior of the refrigerator, which is undesirable.

The present invention is drawn toward advancements in the art of anchoring devices, or anchors, blindly fastenable to panels and combinations thereof.

An object of the invention is to provide novel anchoring devices and anchoring systems that overcome problems in the art.

Another object of the invention is to provide novel anchoring devices and anchoring systems that are reliable and economical.

Another object of the invention is to provide novel anchoring devices fastenable to one side of a panel without protruding fully through the panel so that no part of the anchoring device is visible on the opposite side of the panel.

A further object of the invention is to provide novel anchoring systems having a panel with an anchoring device fastened to one side thereof without protruding therethrough and an anchor locating indicium on another side of the panel opposite the anchoring device to indicate the location of the anchoring device without the use of an opening through the panel.

It is also an object of the invention to provide novel anchoring devices securely fastenable to panels by means other than adhesive.

A more particular object of the invention is to provide novel anchoring devices comprising generally a utility member fastening portion and a plurality of teeth each having a distal tip portion protruding from a side of the anchoring device. The plurality of teeth are oriented at a non-perpendicular angle relative to the anchoring device, and in one embodiment are disposed about the utility member fastening portion thereof.

Another more particular object of the invention is to provide novel anchoring devices comprising generally a plate member with an aperture therethrough, a plurality of at least two teeth having a distal tip portion protruding from a first side of the plate member at a non-perpendicular angle relative thereto. A plurality of material deformation clearances are disposed on the first side of the plate member so that one of the plurality of material deformation clearances is aligned with a corresponding one of the plurality of teeth, adjacent to the tip portion thereof.

Yet another more particular object of the invention is to provide novel anchoring systems comprising generally an anchoring device having a plate member with a fastening member on a first side thereof, and preferably a utility member fastening portion. The anchoring device is fastened to a portion of a panel devoid of openings therethrough by the fastening member, and an anchoring device locating indicium is disposed on a side of the panel opposite the anchoring device, preferably opposite the utility member fastening portion.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
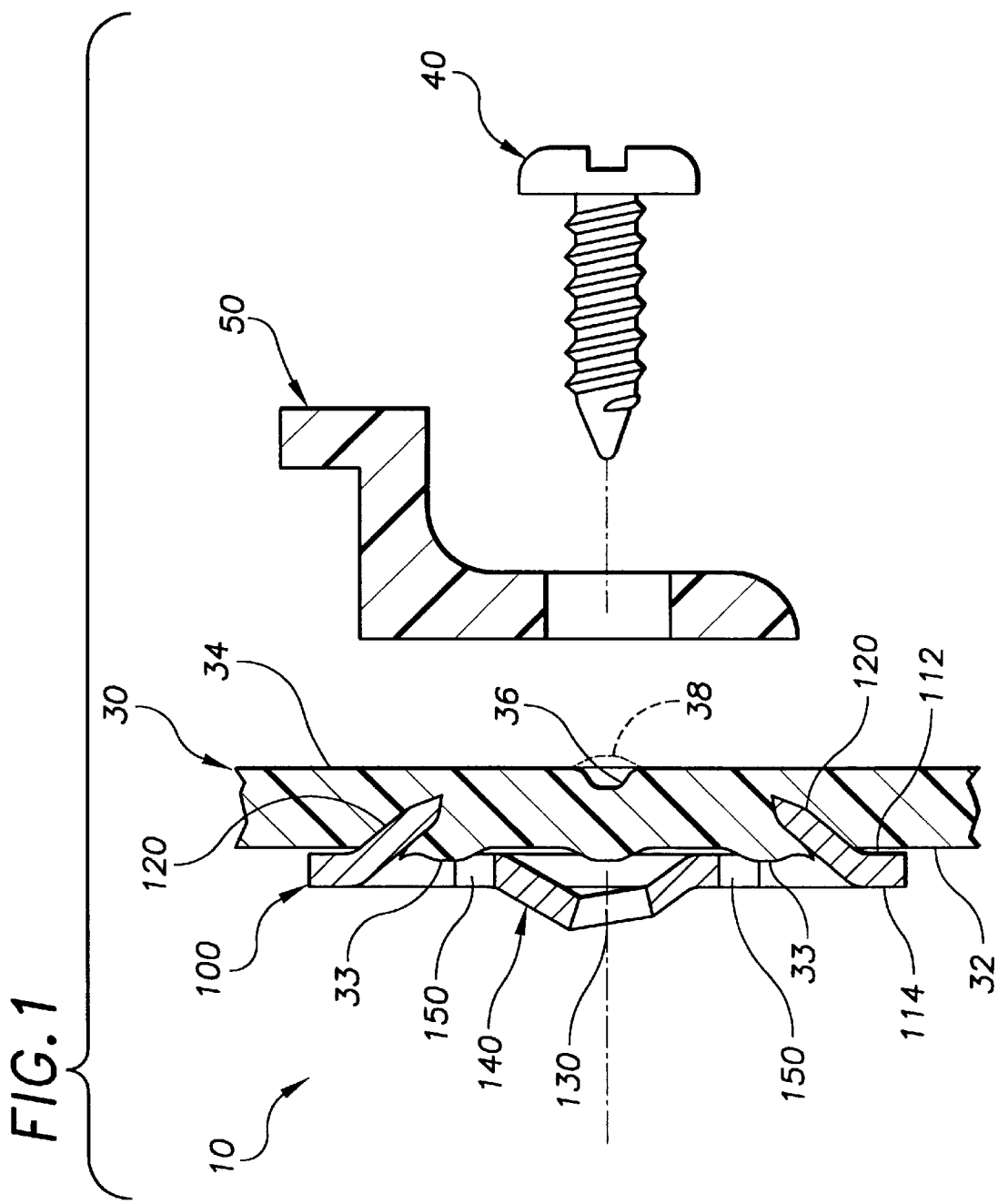
FIG. 1 is a partial sectional view of an anchoring system according to an exemplary embodiment of the invention.

FIG. 1 illustrates an anchoring system 10 comprising generally an anchoring device 100 fastened, preferably blindly, to a first side 32 of the panel 30, and an anchoring device locating indicium, for example the exemplary depression 36 or relief 38, disposed on a second panel side 34 opposite the anchoring device.

The anchoring device comprises generally a plate member having a generally flat portion with a fastening member disposed on one side thereof which is thereby fastenable to the panel. The fastening member may be, for example, an adhesive pad as is known and disclosed on the anchoring device of U.S. Pat. No. 3,802,476 entitled "Screw Anchor" referenced above. Another preferred fastening member is discussed further below.

In some embodiments, the anchoring device 100 includes a utility member fastening portion, for example a threaded screw aperture 130, for accepting a screw 40, which may be used to fasten and support a bracket 50 or other utility member mounted on the second, opposite side 34 of the panel 30. In other embodiments, the anchoring device does not include the aperture but may instead have other structure for fastening a utility member thereto. Alternatively, the anchoring device may not have any utility member fastening portion, and may merely provide stiffening support for a portion of the panel or a utility member mounted on the panel opposite the anchoring device.

Figure 3:
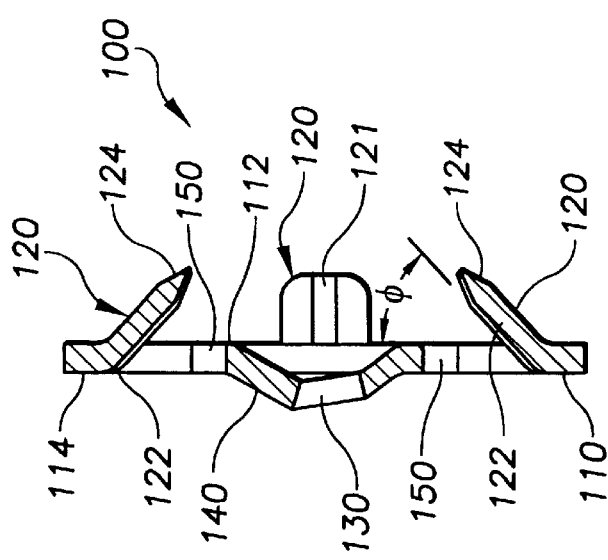
FIG. 3 is a partial sectional view of an anchoring device prior to installation.
Figure 2:
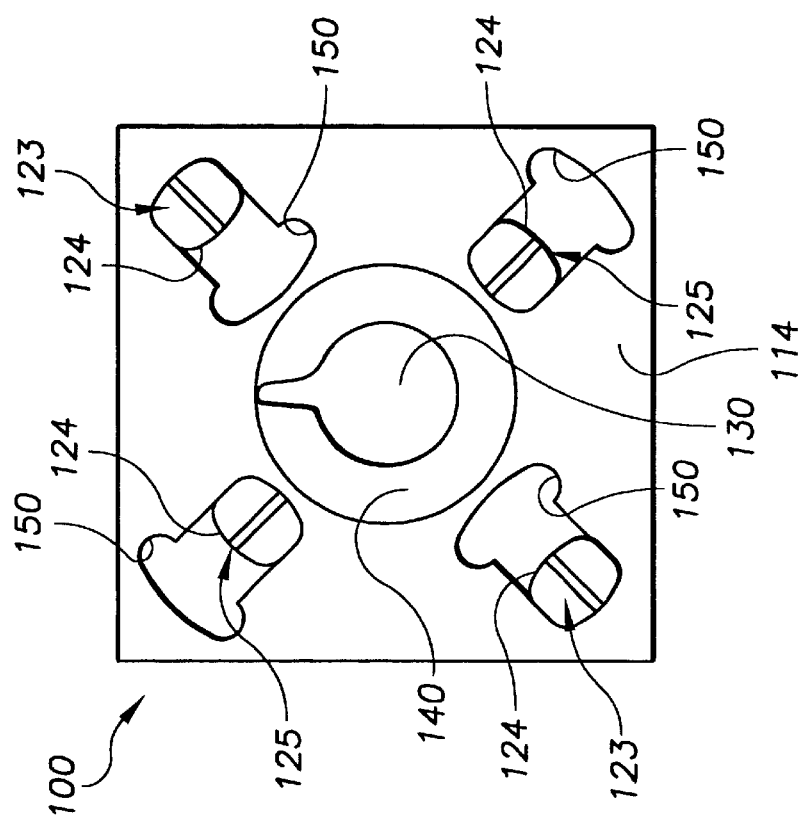
FIG. 2 is a top plan view of an anchoring device according to an exemplary embodiment of the invention.

In the exemplary embodiments of FIG. 3, the anchoring device 100 comprises generally a plate member 110 having a generally flat portion with first and second opposite sides 112 and 114. In FIG. 2, the anchoring device has a generally rectangular or square shape, but alternatively it may have a generally round or oval shape or irregular shape. The anchoring device 100 may also have angled wings extending from the side of the plate member not mounted against the panel, as is known and disclosed in U.S. Pat. No. 3,802,476 entitled "Screw Anchor" referenced above, for example to facilitate handling or automated installation.

In the exemplary embodiment of FIGS. 1 and 3, the fastening member of the anchoring device 100 comprises a plurality of at least two tabs or teeth 120 protruding from the first side 112 of the plate member 110. The exemplary anchoring device 100 of FIG. 2 comprises four teeth, but in other embodiments there may be more or less. In FIG. 3, the plurality of teeth 120 each have abase portion 122 emerging from the plate member 110 and a distal tip portion 124 extending from the base portion thereof. The tip portion 124 of each of the plurality of teeth is preferably sharpened to facilitate fastening to the panel 30, as discussed further below. The plurality of teeth 120 may also have a chevron sectional shape, denoted by a lengthwise fold or crease 121 in FIG. 3, for increased strength.

In FIGS. 1 and 3, the plurality of teeth 120 are oriented at a non-perpendicular angle relative to the plate member 110, and are preferably disposed generally symmetrically on the plate member. In FIG. 3, the angle φ between the plurality of teeth 120 and the plate member 110 is between approximately 20 degrees and approximately 60 degrees prior to installation of the anchoring device 100 onto the panel 30, and in one preferred embodiment the angle φ is approximately 45 degrees. The angle φ between the plurality of teeth and the plate member is preferably the same. The angle φ of the plurality of teeth tends to decrease after installation of the anchor device onto the panel due to deformation thereof, as illustrated in FIG. 1 and discussed below.

The plurality of teeth may all converge toward each other or all diverge away from each other. In FIG. 2, the generally oppositely positioned teeth 123 converge toward each other, and the generally oppositely positioned teeth 125 diverge away from each other. Alternatively, the teeth 120 of FIG. 2 may all converge inwardly or diverge outwardly. In embodiments where there is an odd number of teeth, for example three teeth, the three teeth preferably either all diverge away from each other or all converge toward each other.

In another alternative configuration, instead of the general radial arrangement of teeth about the aperture as in FIG. 2, the teeth in adjacent corners of the anchoring device are oriented to converge toward or diverge away from each other, for example one of the teeth 123 and one of the teeth 125 of FIG. 2 may converge toward or diverge away from each other. Such configurations are also considered to be generally symmetrical.

In the exemplary anchoring device 100 of FIGS. 1–3, the utility member fastening portion is an aperture 130 disposed through a generally flat portion of the plate member 110, and the plurality of teeth 120 are disposed about the aperture 130. FIGS. 1–3 also illustrate a helical depression 140 formed in and protruding from the second side 114 of the plate member 110 about the aperture 130, thus forming a threaded aperture for accommodating a screw. In other embodiments, the aperture 130 need not be threaded for accepting a non-threaded fastener, for example a known expanding type fastener.

The exemplary anchoring device 100 also comprises a plurality of material deformation clearances disposed on the first side of the plate member corresponding to the plurality of teeth. In FIG. 2, more particularly, the plurality of material deformation clearances are a plurality of openings 150 formed through the plate member. One of each of the plurality of material deformation clearances is aligned with a corresponding one of the plurality of teeth 120 and is disposed adjacent to the corresponding tip portion 124 in alignment with the base portion thereof. The openings 150 need not extend fully through the plate member 110, however, and may instead be mere recesses formed in or on the first side of the plate member.

FIG. 1 illustrates the exemplary anchoring device 100 fastened to the panel 30. Generally, the anchoring device 100 is installed by driving the teeth 120 into a side of the panel. Preferably, the teeth are sized and the angle thereof is configured so that they do not penetrate through the panel, whereby the anchoring device is blindly fastenable to one panel side and thus invisible from the opposite side thereof. During installation of the anchoring device, the teeth tend to deform as they penetrate into the panel resulting in a flattening of the teeth relative to the plate member, whereby the angle φ therebetween is reduced. Sharpening the teeth facilitates the insertion thereof into the panel, and is preferred but is not required.

As the teeth 120 penetrate into the panel 30, corresponding portions 33 of the panel are displaced by the teeth to protrude outwardly from the first side 32 of the panel and into the material deformation clearances on the anchoring device 1 10, the openings 150 in FIG. 1, thereby maximizing penetration of the teeth 120 into the panel 30. The material deformation clearances are preferred but are not necessary. Without the material deformation clearances, the displaced portions 33 protruding from the panel bear against the anchoring device and limit how closely it mounts onto the side of the panel. The absence of the material deformation clearances thus tends to limit the extent to which the teeth penetrate into the panel, thereby reducing the holding strength of the anchoring device.

The anchoring device is preferably installed onto the panel with a punch and die assembly as is discussed more fully in the referenced co-pending patent application entitled "Method for Fastening Blind Anchors", which is assigned commonly herewith and fully incorporated herein by reference.

As suggested above, it is desirable in many applications to eliminate the necessity of having openings through the panel, which were required in some prior art anchoring systems to locate the anchoring device when it was blindly installed onto one side thereof. This is especially so in refrigerator applications where insulating foam sometimes leaks through the openings of the panel and contaminates the interior of the refrigerator.

An anchoring device locating indicium is required for locating the anchoring device in applications where it is fastened blindly to one side of the panel, for example in refrigerator applications where the anchoring device is located on an exterior side of a panel without the use of openings therethrough so that the anchoring device is invisible from the interior thereof. The anchoring device locating indicium of the present invention is formed preferably without forming an opening that extends fully through the panel, and is distinguished over the holes through the panels in prior art anchoring systems in that regard.

The anchoring device locating indicium of the present invention may be a depression or relief formed on the side of the panel opposite the anchoring device. In FIG. 1, the anchoring device locating indicium is a depression 36 formed on the second side 34 of the panel 30 opposite the anchoring device 100 and in alignment with the aperture 130 thereof. Alternatively, FIG. 1 illustrates, in phantom lines, the anchoring device locating indicium as a relief 38 formed on, in other words protruding from, the second side 34 of the panel.

Embodying the anchoring device locating indicium as a depression or relief provides both visual and tactile indications for locating the anchoring device, which is particularly desirable for applications where laborers must assemble a fastener through the panel and into the anchoring device without the benefit of adequate visual perception, as in the manufacture of some refrigerators and in other applications. The depression provides the additional benefit of a convenient pilot opening into which a screw may be inserted for subsequent threaded engagement with the aperture of the anchoring device, and is therefore preferred. In other applications however a mere visual indicator, without a tactile indicator, is sufficient for locating the anchoring device on the opposite side of the panel.

The anchoring device locating indicium may be formed in the panel with a punch from either side thereof, and is preferably a depression formed therein with a die sometime during the installation of the anchoring device, as discussed more fully in the referenced co-pending patent application entitled "Method for Fastening Blind Anchor", which is assigned commonly herewith and fully incorporated herein by reference. Alternatively, the anchoring device locating indicium may be formed by other means, for example manually.

The anchoring device of the present invention is preferably a unitary member, for example sheet metal formed in a stamping operation. More particularly, the teeth 120 may be formed by stamping, and may be sharpened in a swaging operation. The aperture 130 and the helical depression 140 formed thereabout may also be formed in stamping operations.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. An anchoring device blindly fastenable to a panel, comprising:
    a plate member having first and second opposite sides;
    a plurality of at least two teeth protruding generally symmetrically from the first side of the plate member, the plurality of teeth oriented at a non-perpendicular angle relative to the plate member, each tooth having a distal tip end portion with a corresponding tip area,
    a plurality of material deformation clearances disposed on the first side of the plate member, each of the plurality of material deformation clearances aligned with a corresponding one of the plurality of teeth and disposed adjacent the distal tip end portion thereof,
    the material deformation clearances each having an area greater than the tip area of the corresponding adjacent distal tip end portion; and
    a utility member fastening portion disposed on the plate member.

2. The anchoring device of claim 1, the utility member fastening portion is an aperture through the plate member.

3. The anchoring device of claim 2, the plurality of teeth are disposed about the aperture.

4. The anchoring device of claim 3, a helical depression formed in the plate; member about the aperture, the helical depression protruding from the second side of the plate, member.

5. The anchoring device of claim 1, the plurality of material deformation clearances are a corresponding plurality of recesses formed in the first side of the plate member.

6. The anchoring device of claim 1, the plurality of material deformation clearances are a corresponding plurality of openings through the plate member.

7. The anchoring device of claim 1, the plurality of teeth converge toward each other.

8. The anchoring device of claim 1, the plurality of teeth each having a base portion emerging from the plate member, the distal tip end portion extending from the base portion, the distal tip end portion of each of the plurality of teeth is sharpened.

9. The anchoring device of claim 1, the angle of the plurality of teeth is between approximately 20 degrees and approximately 60 degrees.

10. An anchoring device comprising:
    a metal plate member having first and second opposite sides;
    a plurality of at least two teeth having a distal tip portion cut from the metal plate member and protruding from the first side thereof at a non-perpendicular angle relative thereto;
    a plurality of material deformation clearances disposed on the first side of the plate member,
    each of the plurality of material deformation clearances disposed adjacent the distal tip portion of a corresponding tooth,
    each of the plurality of material deformation clearances formed on a portion of the plate member adjacent the portion thereof from which the distal tip portion of the corresponding tooth is cut.

11. The anchoring device of claim 10, an aperture through the plate member, a helical depression formed in the plate member about the aperture, the helical depression protruding from the second side of the plate member, the plurality of teeth disposed about the aperture of the plate member.

12. The anchoring device of claim 10, the plurality of teeth converge toward each other.

13. The anchoring device of claim 12, the distal tip portion of each of the plurality of teeth is sharpened.

14. The anchoring device of claim 10, the angle of the plurality of teeth is between approximately 20 degrees and approximately 60 degrees.

15. The anchoring device of claim 10, each of the plurality of material deformation clearances is an aperture through the plate member, each aperture disposed radially and laterally outwardly of the portion of the plate member from which the corresponding distal tip portion is cut.

16. An anchoring system comprising:
   an anchoring device comprising a plate member having first and seconds opposite sides, a fastening member on the first side of the plate member;
   a panel member having a portion devoid of openings therethrough with first and second opposite sides;
   the first side of the anchoring device fastened to the first side of the panel on the portion thereof devoid of openings by the fastening member, no portion of the anchoring device protruding through to the second side of the panel;
   an anchoring device locating indicium disposed on the second side of the panel opposite the anchoring device.

17. The system of claim 16, an aperture through the plate member, the anchoring device locating indicium is one of a depression or relief formed on the second side of the panel opposite the aperture of the anchoring device.

18. The system of claim 16,
   the fastening member is a plurality of at least two teeth protruding generally symmetrically from the first side of the plate member, the plurality of teeth oriented at a non-perpendicular angle relative to the plate member, the plurality of teeth each having a distal tip portion extending from the plate member,
   a plurality of material deformation clearances disposed on the first side of the plate member, one of the plurality of material deformation clearances aligned with a corresponding one of the plurality of teeth and disposed adjacent to the distal tip portion thereof.

19. The system of claim 18, an aperture through the plate member, a helical depression formed about the aperture and protruding from the second side of the plate member, the anchoring device locating indicium is a depression formed on the second side of the panel opposite the aperture of the anchoring device.

20. The system of claim 19, the plurality of teeth disposed about the aperture of the anchoring device.

21. An anchoring device for fastening to a panel, comprising:
   a plate member having first and second opposite sides;
   a plurality of teeth having a distal tip portion cut from the plate member and protruding from the first side thereof at a non-perpendicular angle relative thereto;
   a plurality of material deformation clearances on the plate member, each of the material deformation clearances disposed adjacent a corresponding distal tip portion of a corresponding one of the plurality of teeth,
   each of the plurality of material deformation clearances is an aperture cut from a portion of the plate member adjacent to the portion thereof from which the distal tip portion of the corresponding tooth is cut, and
   a utility member fastening portion disposed on the plate member.

22. The anchoring device of claim 21, the utility member fastening portion is an aperture through the plate member, the plurality of teeth are disposed about the aperture.

23. The anchoring device of claim 22, a helical depression formed in the plate member about the aperture, the helical depression protruding from the second side of the plate member.

24. The anchoring device of claim 21, the plurality of teeth are disposed about the utility member fastening portion of the plate member.

25. The anchoring device of claim 21, the tips of the plurality of teeth extend in the same direction.

26. The anchoring device of claim 21 is a unitary member formed of metal.

27. The anchoring device of claim 21, the angle of the plurality of teeth relative to the plate member is between approximately 20 degrees and approximately 60 degrees.

* * * * *